(12) United States Patent
Beardsley

(10) Patent No.: US 7,908,777 B1
(45) Date of Patent: Mar. 22, 2011

(54) DETACHABLE ALERT DEVICE AND METHOD OF USE

(76) Inventor: Victoria E. Beardsley, Santa Fe, NM (US)

( * ) Notice: Subject to any disclaimer, the term of this patent is extended or adjusted under 35 U.S.C. 154(b) by 314 days.

(21) Appl. No.: 12/031,457

(22) Filed: Feb. 14, 2008

Related U.S. Application Data

(60) Provisional application No. 60/964,376, filed on Aug. 11, 2007.

(51) Int. Cl.
*A47C 1/08* (2006.01)

(52) U.S. Cl. .......................................... 40/320; 40/586

(58) Field of Classification Search .............. 40/6, 320, 40/586, 658, 666, 661.04; 63/1.13, 3.1; 297/250.1; 446/227; 24/306, 442
See application file for complete search history.

(56) References Cited

U.S. PATENT DOCUMENTS

| | | | |
|---|---|---|---|
| 2,994,300 A * | 8/1961 | Grahling | 119/770 |
| 5,793,291 A | 8/1998 | Thornton | |
| 5,848,576 A | 12/1998 | Colaianni | |
| 5,952,927 A | 9/1999 | Eshman et al. | |
| 5,966,070 A | 10/1999 | Thornton | |
| D427,099 S | 6/2000 | Hunter | |
| 6,078,260 A | 6/2000 | Desch | |
| 6,114,963 A | 9/2000 | Blake et al. | |
| 6,339,371 B1 | 1/2002 | Baggelaar et al. | |
| 6,393,348 B1 | 5/2002 | Ziegler et al. | |
| 6,606,768 B2 * | 8/2003 | Henry et al. | 24/306 |
| 6,650,241 B2 | 11/2003 | Osborne et al. | |
| 6,696,943 B1 | 2/2004 | Elrod et al. | |
| 6,720,880 B2 | 4/2004 | Gutta et al. | |
| 6,768,420 B2 | 7/2004 | McCarthy et al. | |
| 6,783,167 B2 | 8/2004 | Bingle et al. | |
| 6,812,844 B1 | 11/2004 | Burgess | |
| 6,819,249 B1 | 11/2004 | Papp | |
| 6,909,365 B2 | 6/2005 | Toles | |
| 6,924,742 B2 | 8/2005 | Mesina | |
| 6,930,614 B2 | 8/2005 | Rackham et al. | |
| 6,998,988 B1 | 2/2006 | Kalce | |
| 7,012,533 B2 | 3/2006 | Younse | |
| D519,686 S * | 4/2006 | Alameddine et al. | D30/153 |
| 7,079,016 B2 | 7/2006 | Ho et al. | |
| 7,097,226 B2 | 8/2006 | Bingle et al. | |
| 7,106,203 B2 | 9/2006 | Edwards et al. | |
| 7,151,452 B2 | 12/2006 | Shieh | |
| 7,152,897 B2 | 12/2006 | Bonnes et al. | |
| 7,204,425 B2 | 4/2007 | Mosher, Jr. et al. | |
| 7,218,211 B2 | 5/2007 | Ho et al. | |
| 7,250,869 B2 | 7/2007 | Davis | |

\* cited by examiner

*Primary Examiner* — Joanne Silbermann
(74) *Attorney, Agent, or Firm* — Eric Karich

(57) ABSTRACT

A detachable alert device, and method of use to remember a child left in a child safety seat, has an anchor element adapted to semi-permanently attach to the child safety seat. A reminder bracelet is adapted to removably attach to the anchor element and has a user engaging element adapted to removably attach the reminder bracelet to a user in a visible position.

1 Claim, 2 Drawing Sheets

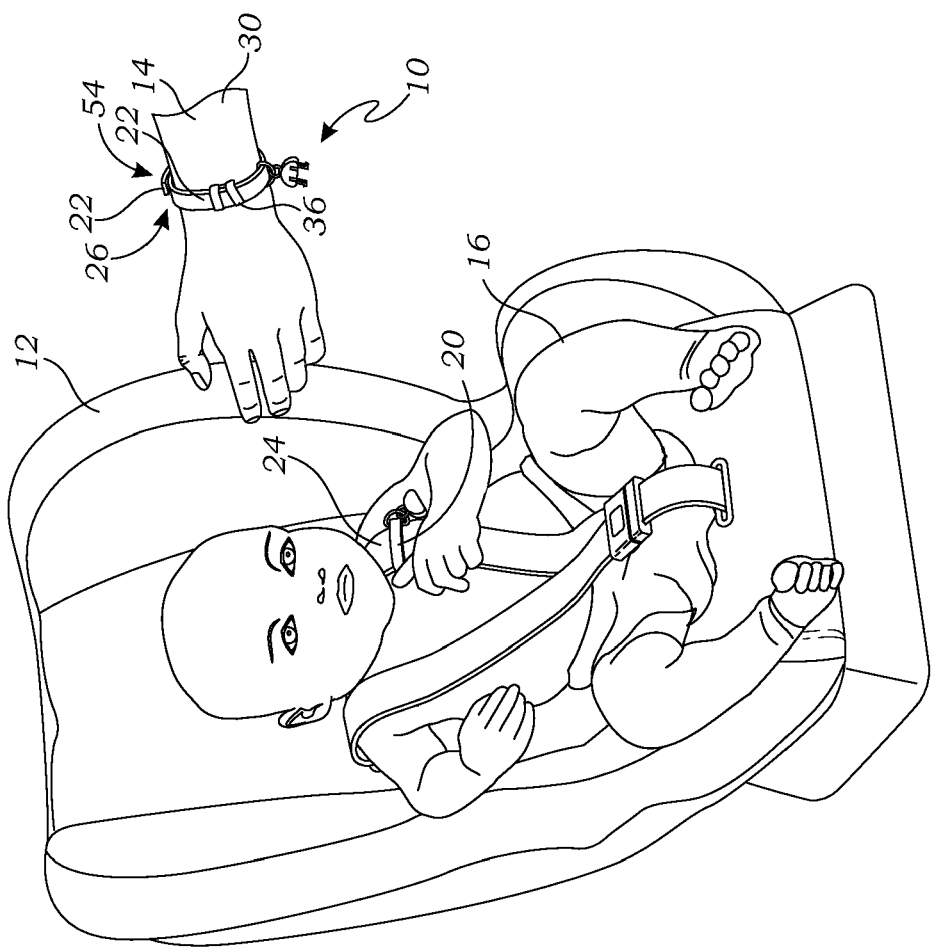
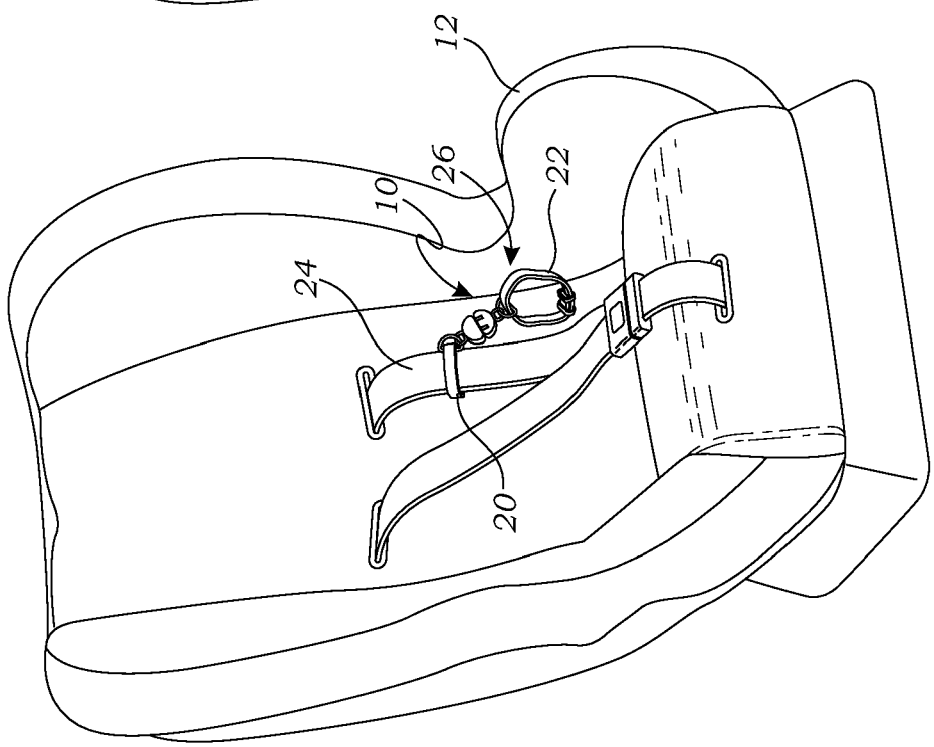
Fig. 2
Fig. 1

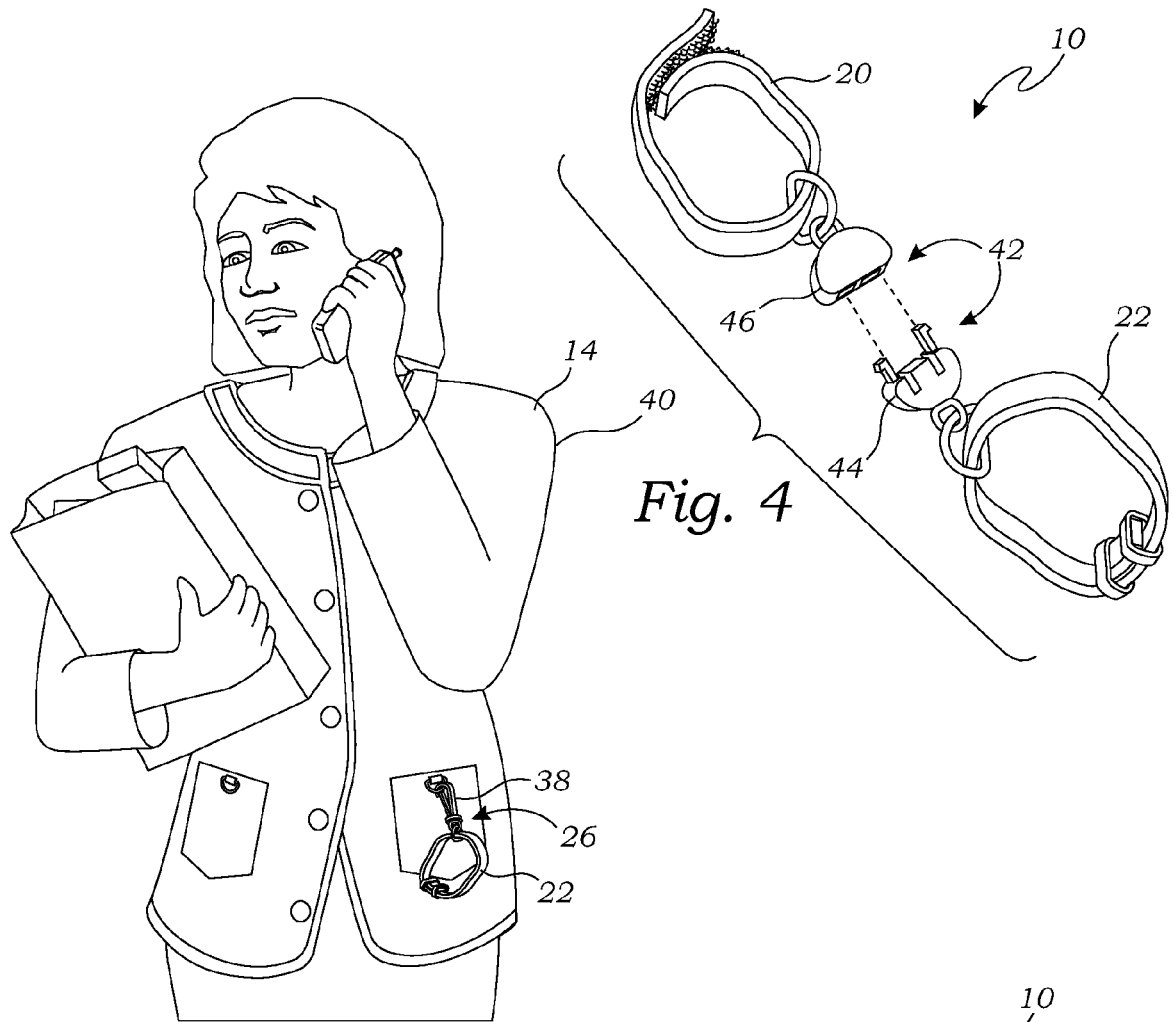
*Fig. 4*
*Fig. 3*
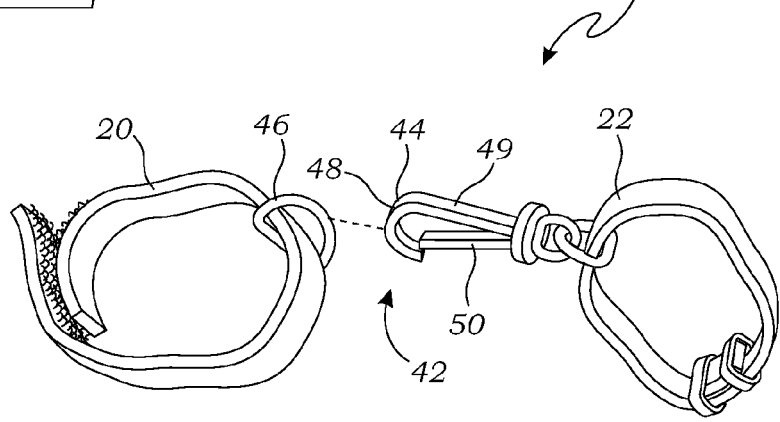
*Fig. 5*

DETACHABLE ALERT DEVICE AND METHOD OF USE

CROSS-REFERENCE TO RELATED APPLICATIONS

This application for a utility patent claims the benefit of U.S. Provisional Application No. 60/964,376, filed Aug. 11, 2007.

STATEMENT REGARDING FEDERALLY SPONSORED RESEARCH

Not Applicable

BACKGROUND OF THE INVENTION

1. Field of the Invention

This invention relates generally to alert devices, and more particularly to a detachable alert device and method of use for remembering children left in child safety seat.

2. Description of Related Art

Each year children are killed when accidentally left in a vehicle unattended. In extreme weather, a child may only need to be left in a vehicle a short time to be harmed or killed. Given the stresses of modern life, it would be helpful to have a device to remind a parent or guardian to take child from the child safety seat.

Various reminder devices may be found in the prior art. The following art defines the present state of this field:

Kalce, U.S. Pat. No. 6,998,988, teaches an electronic infant alarm system for automobiles for sounding an alarm when the driver seat is unoccupied. The system includes a pressure sensor pad for detecting the presence of a person in a car seat, and a belt buckle switch for determining whether a belt buckle is buckled into an infant car seat. A control box is electrically connected to the pressure sensor pad and the belt buckle switch. The control box outputs an alarm signal when the belt buckle switch indicates that the belt buckle is buckled into the infant car seat and the pressure sensor pad does not detect the presence of the person in the car seat.

Rackham, et al., U.S. Pat. No. 6,930,614, teaches a similar alarm system, integrated into a motor vehicle, that triggers an alarm if the driver's door is open and the engine is turned off but there still is an occupant in the motor vehicle.

Younse, U.S. Pat. No. 7,012,533, teaches a child car seat with a built-in cushion switch that closes when the seat is occupied. Push-type switches are added to at least one of the vehicle's side passenger doors, which determines when the car seat is occupied and when one of the doors is open. This enables the vehicle's internal beeper alarm, thereby reminding any occupants exiting the vehicle that a child is strapped in the back seat. Additionally, an inside temperature sensor is coupled to the micro-controller unit, which sets off a loud external alarm such as the vehicle's security alarm, when the temperature inside the vehicle goes above or below a safe preprogrammed environmental range.

The above-described references are hereby incorporated by reference in full.

The prior art teaches electronic sensor and alarm devices for indicating when a child has been left unattended in a vehicle. However, the prior art requires electronic sensor systems which can be expensive and difficult to install. The prior art does not teach a simple, non-electronic method of reminding the user that a child is in the vehicle. The present invention fulfills these needs and provides further related advantages as described in the following summary.

SUMMARY OF THE INVENTION

The present invention teaches certain benefits in construction and use which give rise to the objectives described below.

The present invention provides a detachable alert device for use with a child safety seat. The detachable alert device includes an anchor element adapted to semi-permanently attach to the child safety seat. A reminder bracelet is adapted to removably attach to the anchor element and has a user engaging element adapted to removably attach the reminder bracelet to a user in a visible position.

A primary objective of the present invention is to provide a detachable alert device having advantages not taught by the prior art.

Another objective is to provide a detachable alert device that does not require electricity or batteries to remain active.

A further objective is to provide a detachable alert device that can be easily installed for use with a child safety seat.

Another objective is to provide a detachable alert device that indicates to others that a user may have left a child in their vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a perspective view of a detachable alert device for use with a child safety seat according to a preferred embodiment of the present invention;

FIG. 2 is a perspective view thereof, illustrating a reminder bracelet separated from an anchor element once a baby has been placed in the child safety seat;

FIG. 3 is a perspective view of the detachable alert device, illustrating a link element adapted to removably attach the reminder bracelet to the anchor element;

FIG. 4 is a perspective view of the reminder bracelet, illustrating the reminder bracelet clipped to an article of clothing of a user; and FIG. 5 is a perspective view of the detachable alert device, illustrating an alternate embodiment of the link element.

DETAILED DESCRIPTION OF THE INVENTION

The above-described drawing figures illustrate the invention, a detachable alert device 10 and method of use to remember a child 16 placed in a child safety seat 12. The detachable alert device 10 is useful for reminding a user 14 when a child 16 has been placed in the child safety seat 12 within a vehicle. If the user 14 leaves the vicinity of the child safety seat, the device 10 functions to alert the user 14 that he or she may have forgotten the child 16. The detachable alert device 10 acts as a simple, inexpensive, easily implemented reminder for the user 14 and others that the child 16 has been left in the vehicle.

FIG. 1 is a perspective view of the detachable alert device 10 installed on the child safety seat 12, according to a preferred embodiment of the present invention. As shown in FIG. 1, the detachable alert device 10 includes an anchor element 20 and a reminder bracelet 22. The anchor element 20 is adapted to semi-permanently attach to the child safety seat 12, and the reminder bracelet 22 is adapted to be attached to the anchor element 20 while there is no baby in the child safety seat 12. This maintains the detachable alert device 10 adjacent the child safety seat 12 while not in use.

FIG. 2 is a second perspective view, illustrating a reminder bracelet 22 separated from an anchor element 20 once a baby 16 has been placed in the child safety seat 12. The reminder bracelet 22 is removably attachable to the anchor element 20 so that the reminder bracelet 22 may be readily removed, as shown, so that the user 14 may carry the reminder bracelet 22 while the child 16 is sitting in the safety seat 12.

The reminder bracelet 22 also has a user engaging element 26 adapted to removably attach the reminder bracelet 22 to the user 14 in a visible position. This allows the user 14 to wear the reminder bracelet 22 in a visible position while the child 16 is in the child safety seat 12 and act as an alert that the child 16 is in the vehicle.

As illustrated in FIG. 2, in the preferred embodiment, the user engaging element 26 is adapted to slide onto a wrist 30 of the user 14. As shown in FIG. 2, the user engaging element 26 includes an encircling portion 32 adapted to encircle the user's wrist 30. In the preferred embodiment, the encircling portion 32 includes a sizing element 36 that enables the user to adjust the circumference of the encircling portion 32 to ensure a secure fit around the user's wrist 30.

FIG. 3 is a perspective view of the preferred embodiment of the detachable alert device 10, illustrating one embodiment of a link element 42 that is used to removably attach the anchor element 20 and the reminder bracelet 22. In the embodiment of FIG. 3, the link element 42 includes a male element 44 of the anchor element 20 and a female connector 46 of the reminder bracelet 22 (or vice versa). The male element 44 removably engages the female element 46 to make the removable connection.

In the preferred embodiment, the anchor element 20 is a loop adapted fit around a belt 24 of the child safety seat 12, and may be fastened with hooks and loops fasteners (Velcro®), snaps, fasteners, or other form of attachment. The anchor element 20 may also be any form clip, snap, or element that may be attached with a fastener, adhesive, or any other element or mechanism known to those skilled in the art. While the preferred embodiment secures the anchor element 20 to the belt 24, the anchor element 20 may also be adapted to attach to any part of the child safety seat 12.

As shown in FIG. 3, the reminder bracelet 22 is preferably also a loop that is adapted to slip on the wrist of the user 14; however, the reminder bracelet 22 may also be any other element that facilitates it being carried by the user 14.

FIG. 4 is a perspective view of an alternate embodiment of the reminder bracelet 22. In the embodiment of FIG. 4, the reminder bracelet 22 includes a clip 38 that is adapted to attach on to a clothing article 40 worn by the user 14. In this embodiment, the user 14 can quickly attach the reminder bracelet 22 onto any visible portion of clothing. This allows the user 14 to change the reminder bracelet's 22 position based on comfort and visibility.

FIG. 5 is a perspective view of the detachable alert device 10, illustrating an alternate embodiment of the link element 42. In the alternate embodiment, the link element 42 is a carabiner-type fastener, or similar fastener. The first connector 44 is a carabiner and the second connector 46 is a hoop adapted to engage the carabiner 44. The carabiner 44 has an oblong metal ring 48 with a spring-hinged side 50 that allows the hoop 46 to be enclosed in the metal ring 48 in a connected position. While these two embodiments of the link element 42 have been shown, any fastener such as a key hook, Velcro, magnet, or any other removable linking element known in the art could be used.

As illustrated in FIGS. 1-5, the invention includes a method for using the detachable alert device 10 with the child safety seat 12 to remind the user 14 that the child 16 is in the child safety seat 12. The method includes providing the anchor element 20 and the reminder bracelet 22. The anchor element 20 is attached to the child safety seat 12 such that the anchor element 20 can remain attached indefinitely. The reminder bracelet 22 is attached to the anchor element 20 such that it can later be removed. The device 10 remains attached to the child safety seat 12 until it is needed for use.

When the user 14 places the child 16 into the child safety seat 12, he or she removes the reminder bracelet 22 and attaches the reminder bracelet 22 to himself or herself in a visible position, as described above. For example, it may be attached to his or her wrist 30, as shown in FIG. 2. In an alternate embodiment, the user 14 clips the reminder bracelet 22 on to the article of clothing 40 as shown in FIG. 4. In either embodiment, the reminder bracelet 22 should be positioned so that it is highly visible to the user 14 and others.

If the user 14 leaves the vehicle without the child 16, the reminder bracelet 22 will remind the user 14 to return for the child 16. Once the user 14 has removed the child 16 from the child safety seat 12, the user 14 reattaches the reminder bracelet 22 to the anchor element 20 for later use.

While we describe this invention in terms of remembering children, it is also intended to include pets and similar things to be remembered. For the purpose of this application, child safety seat 12 is defined to include any child booster seat, animal carrier, animal booster seat, or any other specialized vehicle apparatus for transporting fragile occupants. The term child is hereby defined to include pet, or other similar animal or thing to be remembered.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for alerting a user that a child is in a child safety seat, so that the child is not inadvertently left in the child safety seat, the method comprising the steps of:
   providing a detachable alert system comprising an anchor element and a reminder bracelet, the reminder bracelet being adapted to removably attach to the anchor element, wherein the reminder bracelet has a user engaging element adapted to removably attach the reminder bracelet to the user in a visible position;
   attaching the anchor element to the child safety seat so that the reminder bracelet is maintained proximate to the child safety seat when there is no child in the child safety seat;
   placing the child into the child safety seat, and concurrently removing the reminder bracelet from the anchor element and attaching the reminder bracelet to the user in a visible position, so that the reminder bracelet serves as a visible reminder that the child remains in the child safety seat; and removing the child from the child safety seat, and concurrently re-attaching the reminder bracelet to the anchor element, so that the reminder bracelet is readily available the next time the child is placed in the child safety seat.

\* \* \* \* \*